United States Patent Office 2,966,199
Patented Dec. 27, 1960

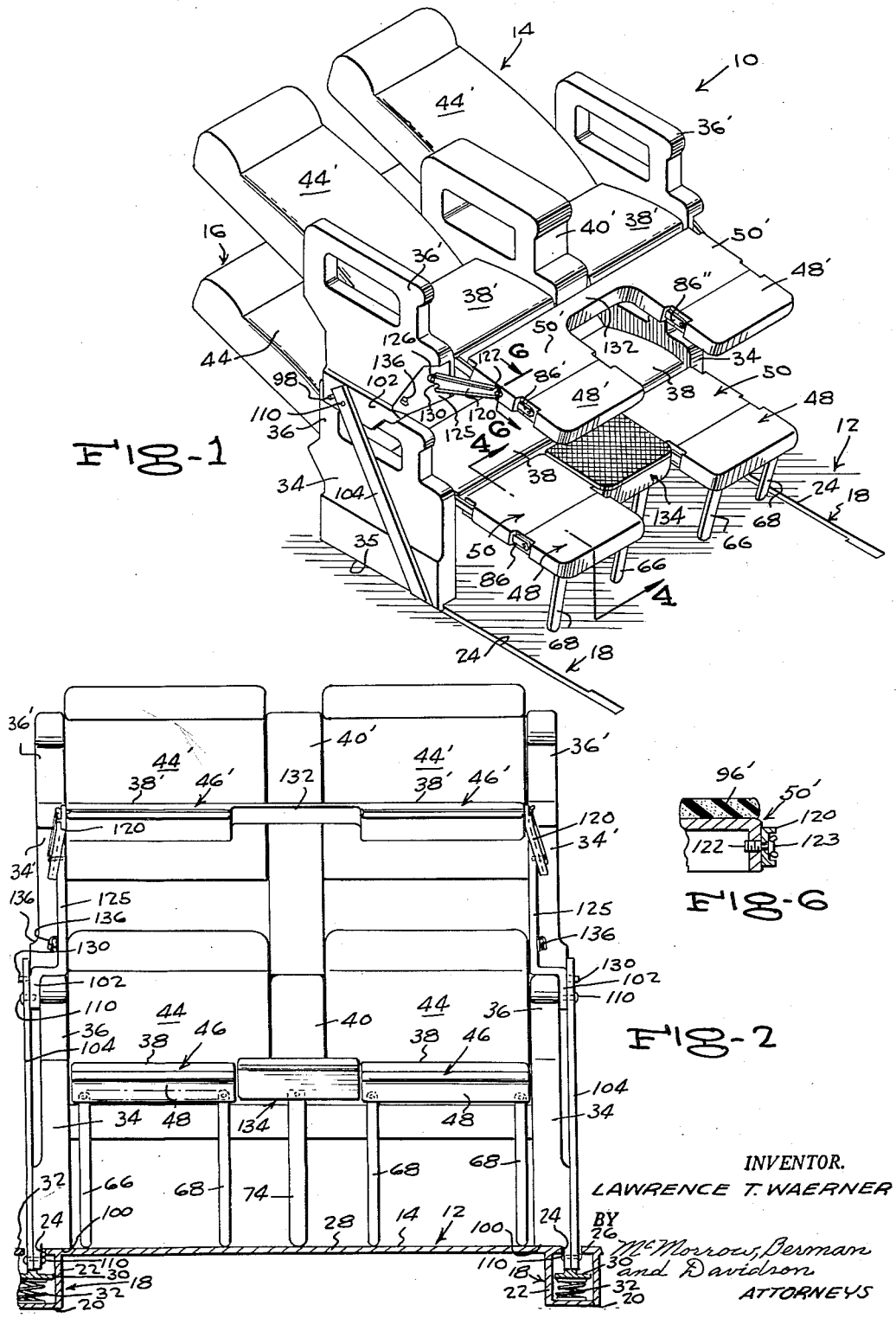

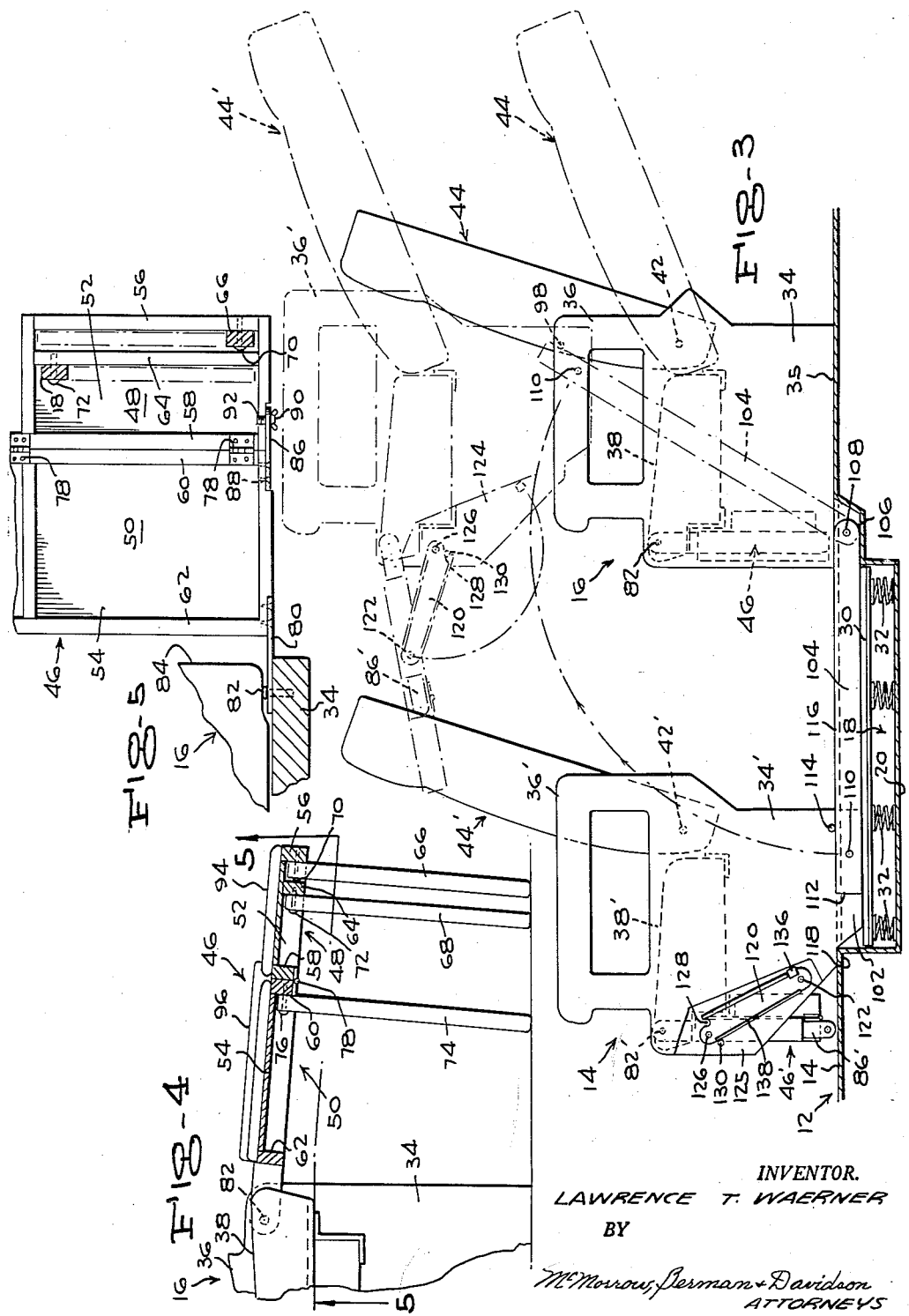

2,966,199
CONVERTIBLE COMBINATION COACH SEAT AND BED
Lawrence T. Waerner, 27 Bracewood Lane, Stamford, Conn.
Filed Apr. 1, 1960, Ser. No. 19,261
12 Claims. (Cl. 155—6)

This invention relates to a novel convertible combination seat and bed for buses, railroad cars, and the like.

The primary object of the invention is to provide a more efficient, more practical, and more easily converted combination of the kind indicated, wherein two longitudinally adjacent seat units are involved and the front seat unit is movable from a depressed floor-supported position, to an elevated position over and resting upon the rear seat unit, so as to provide two superimposed beds, with the leg rests and the back rests of the seat units adjusted to horizontal positions to provide, with the seat pads of the seat units, horizontal sleeping surfaces, so as to enable transportation companies to provide sleeping accommodations at, or at not substantially larger than, coach fare rates.

Another object of the invention is the provision of a combination of the character indicated above, wherein the seat units are composed of two laterally adjacently and rigidly connected seats.

A further object of the invention is the provision, in a combination of the character indicated above, of recess means in the floor in which parts of the front seat unit and elements connecting the two seat units, are engaged, when the front seat unit is in its normal floor-engaging position, and spring-elevated floor plates in said recess means which rise, when the front seat unit is elevated, to form covers for the recess means.

A still further object of the invention is to provide a rugged and long-lived combination of the character indicated above, which is composed of a small number of simple and easily assembled parts, and wherein the front seat unit is securely and safely locked upon the rear seat unit, in the converted condition of the combination.

Other important objects and advantageous features of the invention will be apparent from the following description and the accompanying drawings, wherein, for purposes of illustration only, a speciific form of the invention is set forth in detail.

In the drawings:

Figure 1 is a perspective view of a combination of the invention, showing the same in converted condition;

Figure 2 is an enlarged front elevation of Figure 1;

Figure 3 is a schematic side elevation of the combination, portions being in longitudinal section, showing the front and rear seat units in floor-engaging positions in full lines with their leg rests and back rests in upright positions, and showing the front seat unit imposed upon the rear seat unit in phantom lines with the leg rests and back rests of the units adjusted to horizontal bed-forming positions;

Figure 4 is an enlarged fragmentary vertical longitudinal section taken on the lines 4—4 of Figure 1;

Figure 5 is a fragmentary horizontal section taken on the line 5—5 of Figure 4; and, Figure 6 is an enlarged fragmentary vertical transverse section taken on the line 6—6 of Figure 1.

Referring in detail to the drawings, wherein like numerals designate like parts throughout the several views, the illustrated combination, generally designated 10, comprises a horizontal support, such as a bus or railroad coach floor 12 having an upper surface, a movable front seat unit 14, and a relatively stationary and similar rear seat unit 16, the seat units being longitudinally spaced from each other. Extending longitudinally between and along the opposite sides of the seat units, and extending rearwardly partially under a forward part of the stationary rear seat unit 16, and forwardly under a rear part of the movable front seat unit 14, are relatively narrow, longitudinally elongated wells or recesses 18. The recesses 18 have horizontal bottom walls 20, parallel side walls 22, and have longitudinal slots 24, in their top walls 26, which are spaced between the side walls 22, as shown in Figure 2. The recess top walls 26 can be, as illustrated, portions of a floor plate 28.

Elongated floor plates 30, extending substantially the length and width of the recesses 18, are positioned therein below the top walls 26, and preferably helical, longitudinally spaced elevating springs 32 are suitably secured to, and are compressed between the recess bottom walls 20 and the floor plates 30, so that, when downward pressure upon the floor plates is released, the plates are elevated to engage the undersides of the recess top walls 26, and close the slots 24, and thereby provide a substantially smooth and unindented floor surface, in front of the rear seat unit 16, when the front seat unit 14 is superimposed on the rear seat unit, as shown in Figure 1.

The stationary rear seat unit 16 comprises a pair of laterally spaced vertical side plates 34, which are located substantially in line with the recess slots 24, have lower ends 35 which rest upon and are suitably fixed to the floor 12. On the upper ends of the side plates 24 are rearwardly offset horizontal arm rests 36, and laterally spaced seat pads 38 extend between and are fixed to the side plates 34 at a level immediately below the arm rests 36. Located between the seat pads 38 is a single suitably supported extra width center arm rest 40, the center arm rest 40 being otherwise similar to the arm rests 36 and aligned therewith.

Suitably hinged, as indicated at 42 in Figure 3, to the side plates 34 behind the seat pads 38, are the forward ends of back rests 44, which can be adjusted between upright positions and rearward horizontal reclining positions, suitable means (not shown) being provided to hold these positions.

Mounted on the forward parts of the seat pads 38 are adjustable leg rests 46, which comprise, as shown in Figure 4, front and rear inverted pan-shaped sections 48 and 50, respectively, which have top walls 52 and 54, and front and rear transverse walls 56 and 58, and 60 and 62, respectively; and the front sections 48 have in addition transverse cleats 64 which are spaced rearwardly from their front walls 56. Folding floor-engaging legs 66 and 68 are severally pivoted at their upper ends, as indicated at 70 and 72, respectively, to ends of the front walls 56 and the cleats 64, so that the legs can be folded up into the front section 48 or extended downwardly to engage the floor 12 and support the sections 48 and 50 in horizontal positions. The rear sections 50 also have folding floor-engaging legs 74, which are pivoted, at 76, at their upper ends, to the front walls 60 of the rear sections 50, to afford additional support thereto, in their horizontal positions.

The rear walls 58 of the front sections 48 and the front walls 60 of the rear sections 50, are hinged together, at their lower edges, as indicated at 78, so that the front sections 48 can be folded against the undersides of the rear sections 50, as indicated in phantom lines in Figure 3. The rear sections 50 have suitably fixed along their side edges, rearwardly extending rigid arms 80 which are hinged, at their rear ends, on pins 82 on the inward sides of the side plates 34, the rear walls 62 of the sections 50 being spaced forwardly from the forward edges 84 of the seat pads 38, to provide clearance therebetween to permit the rear sections to be pivoted, downwardly and rearwardly, to erect folded positions beneath the seat pads. For locking the front and rear leg rest sections 48 and 50 in horizontal positions, wherein the rear walls 58 and the front walls 60 thereof are abutted, as shown in Figure 4, locking bars 86 are fixed, at one end, as indicated at 88, to the side edges of the rear sections 50 and extend along the side edges of the front sections 48, bridging the gap between the sections, and have wing bolts 90 at their forward ends, which are threadable into sockets 92 provided in the side edges of the front sections 48, as shown in Figure 5. When unfolded and set up on their legs and locked together, the leg rest sections 48 and 50, and the pads 94 and 96, respectively, fixed thereon, provide horizontal forward extensions of the seat pads 38; and when folded down, the back rests 44 form substantially horizontal rearward extensions of the seat pads 38, the three elements together providing a full-length bed or sleeping surface. At the upper rear corners of the outer arm rests 36 are fixed laterally outwardly extending stop lugs 98 for a purpose hereinafter described.

The front seat unit 14 has substantially the same construction as the rear seat unit 16, except that the side pates 34' thereof have, on their lower ends, downwardly extending longitudinal flanges 102 which are narrower than the lower ends, and which extend down through the well slots 24 and bear downwardly upon and depress the floor plates 30, as shown in Figure 3, with the lower edges 100 of the side plates 34' bearing upon the floor 12, when the front seat unit is in its normal position of use as a dual seat. The flanges 102 are located at the laterally outward sides of the side plates 34', so that when the front seat unit 14 is superimposed upon the rear seat unit 16, the lower edges 100 of the side plates 34' rest upon the tops of the outer arm rests 36 of the rear section 16, with the flanges 102 bearing against the laterally outward sides of the arm rests 36, as shown in Figures 1 and 3, so that lateral shifting of the front seat unit relative to the rear seat unit is precluded.

Elongated flat levers 104, which normally extend horizontally and longitudinally in the floor recesses 18 and bear upon the floor plates 30 and upon rests 106 elevated above the bottom walls 20 at the rear ends of the recesses 18, as shown in Figure 3, are pivoted at their rear ends, on pivot pins 108 which extend crosswise of the recesses, at the rear ends of the recesses. The levers 104 are located outside of the side plates 34' of the rear seat unit 16, and are pivoted, as indicated at 110, at points near to and spaced inwardly from their free forward or upper ends 112, to the laterally outward sides of the flanges 102, at points near to and spaced from the rear ends of the flanges 102; and lateral support lugs 114 are fixed to and extend laterally outwardly from the side plates 34', at locations above and to the rear of the pivots 110, and bear upon the upper edges 116 of the levers 104. Floor-engaging shoulders 118 are forward portions of the lower edges of the side plates 34' and bear upon the floor 12 at the forward ends of the recesses 18, the lugs 114 and the shoulders 118 supplementing each other in supporting the front seat 14 in a level position on the floor 12.

To superimpose the front seat unit 14 upon the rear seat unit 16, the front seat unit is pushed upwardly and rearwardly, on the axes of the pivots 110 and 108, until the lower edges of the front unit side plates 34' bear upon the tops of the rear unit outer arm rests 36, with the flanges 102 at the outer sides of the arms rests 36, and the then upper ends of the levers 104 bear rearwardly, in over-center rearwardly angled positions, against the stop lugs 98 on the rear unit outer arm rest 36, as shown in Figure 3. Because of the weight of the superimposed front seat unit 14, and an occupant reclining thereon, and the past-center positions of the levers 104, forward shifting of the front seat unit, relative to the rear seat unit 16, is precluded, until and unless a very small, and not to be expected, force is exerted at an upward and forward angle, on the upper seat unit, sufficient to move it upwardly and forwardly relative to the lower or rear seat unit.

The leg rests 46' of the front seat unit 14 are devoid of floor-engaging legs, and have instead, for holding the leg rests up in horizontal positions, struts 120 which are pivoted at their forward ends, to forward portions of the side edges of the rear leg rest sections 50', by means of bolts 122 projecting laterally therefrom, over which the struts are removably engaged, the bolts being provided with removable wing nuts 123, as shown in Figure 6. The struts 120 are pivoted, at their rear ends, as indicated at 126, on the laterally outward sides of and adjacent to the upper ends of vertically elongated laterally inset portions 125 on the outer sides of the side plates 34', along the forward edges thereof. At locations spaced below the points 126, the rear ends of the struts 120 have notches 128, which, in the leg rest supporting positions of the struts, engage stop lugs 130 on the outer sides of the inset portions 125, whereby the struts 120 are held in forwardly and upwardly angled positions in which the leg rests are horizontal. As shown in Figure 1, the rear leg rests sections 50' are rigidly connected together by a connecting portion 132. The leg rests 46 of the rear seat unit 16 are laterally spaced from each other, as are the leg rests 46' of the front seat unit 14, and in the case of the rear seat unit, the space between the leg rests can be taken up by a stool 134 hinged thereto and resting on the floor 12 therebetween, as shown in Figure 1. When the leg rest assembly of the upper or front seat unit 14 is to be folded down to the inoperative position shown in full lines in Figure 3, the wing nuts 123 on the bolts 122 are removed and the struts pulled off the bolts 122.

When the weight of the front seat unit 14 is taken off the levers 104, as said unit is elevated to superimpose it upon the rear seat unit 16, as above-described, the springs 32 beneath the floor plates 30 expand and push the floor plates 30 up against the undersides of the recess top walls 26 and close the floor slots 24. As shown in Figure 3, the mounting plates 125 on the front seat unit side plates 34' have, at the lower ends of their rear edges, detents 136, in which the then pendant forward ends of the struts 120 are engageable, in the inoperative positions of the struts, and the then forward edges 138 of the struts bear against the upper stop lugs 130 on the mounting plates 123, whereby the struts 130 are held against swinging freely while not in use for supporting the leg rest assemblies of the front seat unit.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A convertible coach seat and bed, comprising a horizontal support, a movable seat unit resting on said support, a stationary seat unit fixed to said support and spaced from said first seat unit, lever means having a first end pivoted on said support at a point adjacent to said stationary seat unit, said lever means having a second end pivoted to said movable seat unit, said movable seat unit being movable upwardly away from said support and over said stationary seat unit to rest upon the stationary seat unit.

2. A convertible coach seat and bed, comprising a horizontal support, a movable seat unit resting on said support, a stationary seat unit fixed to said support and spaced from said first seat unit, lever means having a first end pivoted on said support at a point adjacent to said stationary seat unit, said lever means having a second end pivoted to said movable seat unit, said movable seat unit being movable upwardly away from said support and over said stationary seat unit to rest upon the stationary seat unit, said seat units having seat pads, back rests as extensions of the seat pads at one side thereof, and leg rests as extensions of the seat pads at the other sides thereof.

3. A convertible coach seat and bed, comprising a horizontal support, a movable seat unit resting on said support, a stationary seat unit fixed to said support and spaced from said first seat unit, lever means having a first end pivoted on said support at a point adjacent to said stationary seat unit, said lever means having a second end pivoted to said movable seat unit, said movable seat unit being movable upwardly away from said support and over said stationary seat unit to rest upon the stationary seat unit, each of said seat units comprising two laterally adjacent seats.

4. A convertible coach seat and bed, comprising a horizontal support, a movable seat unit resting on said support, a stationary seat unit fixed to said support and spaced from said first seat unit, lever means having a first end pivoted on said support at a point adjacent to said stationary seat unit, said lever means having a second end pivoted to said movable seat unit, said movable seat unit being movable upwardly away from said support and over said stationary seat unit to rest upon the stationary seat unit, each of said seat units comprising two laterally adjacent seats, each seat comprising a seat pad, a back rest, and a leg rest at opposite ends of the seat pad, the back rests and the leg rests being adjustable to horizontal positions to form a sleeping surface with the seat pad, from erect positions.

5. A convertible coach seat and bed, comprising a horizontal support, a movable seat unit resting on said support, a stationary seat unit fixed to said support and spaced from said first seat unit, lever means having a first end pivoted on said support at a point adjacent to said stationary seat unit, said lever means having a second end pivoted to said movable seat unit, said movable seat unit being movable upwardly away from said support and over said stationary seat unit to rest upon the stationary seat unit, said seat units having seat pads, back rests as extensions of the seat pads at one side thereof, and leg rests as extensions of the seat pads at the other sides thereof, said seat units being substantially similar.

6. A convertible combination coach seat and bed comprising a horizontal floor, a movable front seat unit, a rear stationary seat unit spaced behind said front seat unit, said rear unit having side plates having lower ends resting upon and being fixed to the floor, said front unit having side plates having lower ends resting freely upon the floor, seat pads extending between and fixed to the side plates of the units, back rests located between and hinged to the side plates of the units rearwardly of the seat pads, folding leg rest assemblies located between and hinged to the side plates of the units at the forward ends of the side plates, said back rests being adjustable to depressed horizontal positions as rearward extensions of the seat pads, and said leg rest assemblies being adjustable upwardly from pendant positions to horizontal positions as forward extensions of the seat pads, folding floor-engaging means on the leg assembly of the rear seat unit for supporting the leg rest assembly thereof on the floor in horizontal position, and folding strut means on the front seat unit engageable with the side plates of the front unit for supporting the front seat unit leg assembly in horizontal position, and levers having first ends pivoted to the front unit side plates at the lower rear corners thereof, said levers having second ends pivoted to parts on the floor, said front seat unit being upwardly and rearwardly swingable off the floor and onto the upper ends of the side plates of the rear seat unit.

7. A convertible combination coach seat and bed comprising a horizontal floor, a movable front seat unit, a rear stationary seat unit spaced behind said front seat unit, said rear unit having side plates having lower ends resting upon and being fixed to the floor, said front unit having side plates having lower ends resting freely upon the floor, seat pads extending between and fixed to the side plates of the units, back rests located between and hinged to the side plates of the units rearwardly of the seat pads, folding leg rest assemblies located between and hinged to the side plates of the units at the forward ends of the side plates, said back rests being adjustable to depressed horizontal positions as rearward extensions of the seat pads, and said leg rest assemblies being adjustable upwardly from pendant positions to horizontal positions as forward extensions of the seat pads, folding floor-engaging means on the leg assembly of the rear seat unit for supporting the leg rest assembly thereof on the floor in horizontal position, and folding strut means on the front seat unit engageable with the side plates of the front unit for supporting the front seat unit leg assembly in horizontal position, and levers having first ends pivoted to the front unit side plates at the lower rear corners thereof, said levers having second ends pivoted to parts on the floor, said front seat unit being upwardly and rearwardly swingable off the floor and onto the upper ends of the side plates of the rear seat unit with the levers angled rearwardly relative to the perpendicular in rearward over-center positions, and stop lugs on the upper rear corners of the side plates of the rear seat unit against which the first ends of the levers bear in their over-center positions.

8. A convertible combination coach seat and bed comprising a horizontal floor, a movable front seat unit, a rear stationary seat unit spaced behind said front seat unit, said rear unit having side plates having lower ends resting upon and being fixed to the floor, said front unit having side plates having lower ends resting freely upon the floor, seat pads extending between and fixed to the side plates of the units, back rests located between and hinged to the side plates of the units rearwardly of the seat pads, folding leg rest assemblies located between and hinged to the side plates of the units at the forward ends of the side plates, said back rests being adjustable to depressed horizontal positions as rearward extensions of the seat pads, and said leg rest assemblies being adjustable upwardly from pendant positions to horizontal positions as forward extensions of the seat pads, folding floor-engaging means on the leg assembly of the rear seat unit for supporting the leg rest assembly thereof on the floor in horizontal position, and folding strut means on the front seat unit engageable with the side plates of the front unit for supporting the front seat unit leg assembly in horizontal position, and levers having first ends pivoted to the front unit side plates at the lower rear corners thereof, said levers having second ends pivoted to parts on the floor, said front seat unit being upwardly and rearwardly swingable off the floor and onto the upper ends of the side plates of the rear seat unit with the levers angled rearwardly relative to the perpendicular in rearward over-center positions, and stop lugs on the upper rear corners of the side plates of the rear seat unit against which the first ends of the levers bear in their over-center positions, said seat units being substantially similar, each seat unit having a pair of laterally adjacent seat pads, back rests, and leg rests.

9. A convertible combination coach seat and bed comprising a horizontal floor, a movable front seat unit, a rear stationary seat unit spaced behind said front seat unit, said rear unit having side plates having lower ends resting upon and being fixed to the floor, said front unit having side plates having lower ends resting freely upon the floor, seat pads extending between and fixed to the side plates of the units, back rests located between and hinged to the side plates of the units rearwardly of the seat pads, folding leg rest assemblies located between and hinged to the side plates of the units at the forward ends of the side plates, said back rests being adjustable to depressed horizontal positions as rearward extensions of the seat pads, and said leg rest assemblies being adjustable upwardly from pendant positions to horizontal positions as forward extensions of the seat pads, folding floor-engaging means on the leg assembly of the rear seat unit for supporting the leg rest assembly thereof on the floor in horizontal position, and folding strut means on the front seat unit engageable with the side plates of the front unit for supporting the front seat unit leg assembly in horizontal position, and levers having first ends pivoted to the front unit side plates at the lower rear corners thereof, said levers having second ends pivoted to parts on the floor, said front seat unit being upwardly and rearwardly swingable off the floor and onto the upper ends of the side plates of the rear seat unit with the levers angled rearwardly relative to the perpendicular in rearward over-center positions, and stop lugs on the upper rear corners of the side plates of the rear seat unit against which the first ends of the levers bear in their over-center positions, said floor having laterally spaced longitudinal wells therein extending between the seat units, said wells having top walls at floor level and formed with longitudinal slots narrower than the wells, floor plates extending along and within the wells beneath the top walls, spring means urging the floor plates upwardly toward engagement with the top walls to close the slots, said levers being positioned in the wells through the slots and engaged with and depressing the floor plates against the resistance of the spring means, while the front seat unit rests upon the floor.

10. A convertible combination coach seat and bed comprising a horizontal floor, a movable front seat unit, a rear stationary seat unit spaced behind said front seat unit, said rear unit having side plates having lower ends resting upon and being fixed to the floor, said front unit having side plates having lower ends resting freely upon the floor, seat pads extending between and fixed to the side plates of the units, back rests located between and hinged to the side plates of the units rearwardly of the seat pads, folding leg rest assemblies located between and hinged to the side plates of the units at the forward ends of the side plates, said back rests being adjustable to depressed horizontal positions as rearward extensions of the seat pads, and said leg rest assemblies being adjustable upwardly from pendant positions to horizontal positions as forward extensions of the seat pads, folding floor-engaging means on the leg assembly of the rear seat unit for supporting the leg rest assembly thereof on the floor in horizontal position, and folding strut means on the front seat unit engageable with the side plates of the front unit for supporting the front seat unit leg assembly in horizontal position, and levers having first ends pivoted to the front unit side plates at the lower rear corners thereof, said levers having second ends pivoted to parts on the floor, said front seat unit being upwardly and rearwardly swingable off the floor and onto the upper ends of the side plates of the rear seat unit with the levers angled rearwardly relative to the perpendicular in rearward over-center positions, and stop lugs on the upper rear corners of the side plates of the rear seat unit against which the first ends of the levers bear in their over-center positions, said leg rest assemblies comprising rear sections pivoted on the side plates, front sections positioned forwardly of and hinged on the rear sections to fold behind the rear sections with the rear sections pivoted to pendant positions, and releasable locking means for holding the sections in elevated horizontal relationship.

11. A convertible combination coach seat and bed comprising a horizontal floor, a movable front seat unit, a rear stationary seat unit spaced behind said front seat unit, said rear unit having side plates having lower ends resting upon and being fixed to the floor, said front unit having side plates having lower ends resting freely upon the floor, seat pads extending between and fixed to the side plates of the units, back rests located between and hinged to the side plates of the units rearwardly of the seat pads, folding leg rest assemblies located between and hinged to the side plates of the units at the forward ends of the side plates, said back rests being adjustable to depressed horizontal positions as rearward extensions of the seat pads, and said leg rest assemblies being adjustable upwardly from pendant positions to horizontal positions as forward extensions of the seat pads, folding floor-engaging means on the leg assembly of the rear seat unit for supporting the leg rest assembly thereof on the floor in horizontal position, and folding strut means on the front seat unit engageable with the side plates of the front unit for supporting the front seat unit leg assembly in horizontal position, and levers having first ends pivoted to the front unit side plates at the lower rear corners thereof, said levers having second ends pivoted to parts on the floor, said front seat unit being upwardly and rearwardly swingable off the floor and onto the upper ends of the side plates of the rear seat unit with the levers angled rearwardly relative to the perpendicular in rearward over-center positions, and stop lugs on the upper rear corners of the sides plates of the rear seat unit against which the first ends of the levers bear in their over-center positions, said leg rest assemblies comprising rear sections pivoted on the side plates, front sections positioned forwardly of and hinged on the rear sections to fold behind the rear sections with the rear sections pivoted to pendant positions, and releasable locking means for holding the sections in elevated horizontal relationship, said folding strut means comprising a normally diagonal strut having a forward end removably pivoted to a side edge of a rear leg rest section, a rear end pivoted to a seat unit side plate, on a level below the forward end of the strut, a stop pin on said side plate beneath the rear end of the strut, and an element on said rear end below the pivot thereof engageable with said stop pin only in the elevated position of the leg rest assembly.

12. A convertible combination coach seat and bed comprising a horizontal floor, a movable front seat unit, a rear stationary seat unit spaced behind said front seat unit, said rear unit having side plates having lower ends resting upon and being fixed to the floor, said front unit having side plates having lower ends resting freely upon the floor, seat pads extending between and fixed to the side plates of the units, back rests located between and hinged to the side plates of the units rearwardly of the seat pads, folding leg rest assemblies located between and hinged to the side plates of the units at the forward ends of the side plates, said back rests being adjustable to depressed horizontal positions as rearward extensions of the seat pads, and said leg rest assemblies being adjustable upwardly from pendant positions to horizontal positions as forward extension of the seat pads, folding floor-engaging means on the leg assembly of the rear seat unit for supporting the leg rest assembly thereof on the floor in horizontal position, and folding strut means on the front seat unit engageable with the side plates of the front unit for supporting the front seat unit leg assembly in horizontal position, and levers having first ends pivoted to the front unit side plates at the lower rear corners thereof, said levers having second ends pivoted to parts on the floor, said front seat unit being upwardly and rearwardly swingable off the floor and onto the upper ends of the side plates of the rear seat unit with the levers angled rearwardly relative to the perpendicular in rearward over-center positions, and stop lugs on the upper rear corners of the side plates of the rear seat unit against which the first ends of the levers bear in their over-center positions, the side plates of the seat units having arm rests upstanding on their upper ends, the lower edges of the side plates of the movable seat unit being adapted to rest upon the arm rests of the stationary seat unit.

References Cited in the file of this patent

UNITED STATES PATENTS

| 287,999 | Black | Nov. 6, 1883 |
| 415,971 | Kerr | Nov. 26, 1889 |
| 622,962 | Menger | Apr. 11, 1899 |
| 2,605,064 | Davis | July 29, 1952 |

FOREIGN PATENTS

| 657,945 | Great Britain | Sept. 26, 1951 |